US010662949B2

(12) United States Patent
Arnold

(10) Patent No.: US 10,662,949 B2
(45) Date of Patent: May 26, 2020

(54) INLET SYSTEM FOR A RADIAL COMPRESSOR WITH A WIDE FLOW RANGE REQUIREMENT

(71) Applicant: Steven Don Arnold, Rancho Palos Verdes, CA (US)

(72) Inventor: Steven Don Arnold, Rancho Palos Verdes, CA (US)

(*) Notice: Subject to any disclaimer, the term of this patent is extended or adjusted under 35 U.S.C. 154(b) by 255 days.

(21) Appl. No.: 15/630,768

(22) Filed: Jun. 22, 2017

(65) Prior Publication Data

US 2017/0370361 A1 Dec. 28, 2017

Related U.S. Application Data

(60) Provisional application No. 62/353,371, filed on Jun. 22, 2016.

(51) Int. Cl.
| | | |
|---|---|---|
| *F04C 29/12* | (2006.01) | |
| *F02B 33/30* | (2006.01) | |
| *F02B 37/14* | (2006.01) | |
| *F01D 5/04* | (2006.01) | |
| *F04D 29/28* | (2006.01) | |
| *F04D 29/42* | (2006.01) | |
| *F04D 17/10* | (2006.01) | |

(52) U.S. Cl.
CPC ............ *F04C 29/122* (2013.01); *F02B 33/30* (2013.01); *F02B 37/14* (2013.01); *F04D 17/10* (2013.01); *F04D 29/284* (2013.01); *F04D 29/4213* (2013.01); *F01D 5/043* (2013.01); *F05D 2260/14* (2013.01); *Y02T 10/144* (2013.01)

(58) Field of Classification Search
CPC ...... F04D 17/10; F04D 29/122; F04D 29/284; F04D 29/4213; F02B 33/30; F02B 37/14; F01D 5/043; F05D 2260/14; Y02T 10/144
See application file for complete search history.

(56) References Cited

U.S. PATENT DOCUMENTS

| | | | | |
|---|---|---|---|---|
| 5,975,845 | A * | 11/1999 | Ball | F01D 11/02 415/173.4 |
| 7,189,052 | B2 * | 3/2007 | Jones | F02B 33/40 415/170.1 |
| 8,880,320 | B2 * | 11/2014 | Panciroli | F02B 37/16 123/559.1 |
| 9,200,639 | B2 * | 12/2015 | Li | F04D 29/4206 |
| 2002/0012586 | A1 * | 1/2002 | Nikpour | F04D 25/04 415/206 |
| 2005/0056014 | A1 * | 3/2005 | Arnold | F01D 17/143 60/602 |
| 2007/0137201 | A1 * | 6/2007 | Arnold | F04D 27/0207 60/605.1 |
| 2010/0005799 | A1 * | 1/2010 | Nikpour | F04D 27/0207 60/605.1 |

(Continued)

FOREIGN PATENT DOCUMENTS

DE 4213047 A1 * 10/1993 ............. F02B 21/00

*Primary Examiner* — Igor Kershteyn
(74) *Attorney, Agent, or Firm* — Felix L. Fischer

(57) ABSTRACT

A radial compressor employs a compressor wheel having an inducer. An inlet air passage has a first region and a second region separated from the first region by a divider wall. The divider wall extends from an inlet plane of the inducer and connects the first region to a first air filter and said second region to a second air filter.

9 Claims, 9 Drawing Sheets

(56) References Cited

U.S. PATENT DOCUMENTS

2012/0294703 A1* 11/2012 Lei .................. F04D 17/105
                                                    415/1
2016/0090948 A1*  3/2016 Svihla ............ F02M 35/10157
                                                   105/62.1

* cited by examiner

INLET SYSTEM FOR A RADIAL COMPRESSOR WITH A WIDE FLOW RANGE REQUIREMENT

REFERENCES TO RELATED APPLICATIONS

This application claims priority of U.S. provisional application Ser. No. 62353371 filed on Jun. 22, 2016 entitled IMPROVED INLET SYSTEM FOR A RADIAL COMPRESSOR WITH A WIDE FLOW RANGE REQUIREMENT, the disclosure of which is incorporated herein by reference.

BACKGROUND

Field

This invention relates generally to the field of radial compressors and more particularly to an inlet for a radial compressor having a compressor wheel with blades that define an inducer and an exducer, an inlet air passage incorporating two or more concentric regions that are separated from each other from a point adjacent to the inducer to an air filter.

Related Art

The flow range of a turbocharger compressor, defined as the ratio of choke flow to surge flow at a fixed pressure ratio, is an attribute that always needs improvement. Turbomachinery is inherently a narrow range technology due to the fact that flow vectors change with flow, and the geometry is designed for specific flow vectors. Therefore, whenever the mass flow is not the design mass flow, the actual flow vectors are different than the geometry was designed for. As flow is increased, the limiting factor is choking of the compressor inducer. As flow decreases, the limiting factor is surge of the compressor inducer or diffuser.

Turbochargers are used on wide variety of engines each of which can have different characteristics and requirements. Although there are a complex set of variables that determine the turbocharger characteristics, the most dominant characteristic is the speed range of the engine. At one extreme, an example would be high performance gasoline motorcycle engines, some of which have a maximum speed of 16,000 rpm. At the other end of the spectrum an example would be gen-sets that run at one fixed speed to allow the generator to provide a fixed electrical AC frequency. Conventional radial compressors work extremely well for the gen-sets, but are inadequate for high speed gasoline engines. Other than constant speed engines such as a gen-set, most other engines require a broad flow range which is the weakest attribute of a radial compressor.

The second most dominant engine attribute determining the requirements of the compressor is the Brake Mean Effective Pressure (BMEP). The higher the engine BMEP, the higher the compressor boost pressure requirement.

The maximum flow of a compressor design is determined by the throat area of the inducer. As the inducer flow area is increased relative to the maximum diameter of the compressor wheel, there is a practical limit as the maximum efficiency declines. Therefore, to make significant improvements in flow range to a compressor of fixed diameter, the surge line must be improved, i.e. moved to lower flow.

The focus of compressor design for turbochargers has been to improve the flow range, especially to move the surge line to the left on the flow versus pressure ratio map. One can look at the historical trends to verify this. Compressors designed in the 1960s using basic principles and slide rule calculations could produce 80% efficiency. Today using computer clusters combined with auto-optimization programs that modify geometric parameters then run computational fluid dynamics programs and finite element stress analysis, also result in about 80% maximum efficiency. However, the flow range of the compressors is significantly improved in today's compressors demonstrating that the engineering focus has been on improving the flow range of compressors.

An important facet of radial compressor design to note is that there are two surge/stall mechanisms. One is the compressor inducer, the other is the diffuser. This can be seen in many compressor maps as there are two slopes to the surge line. At low pressure ratio, the diffuser stalls, then at higher pressure ratio the inducer stalls.

A device commonly referred to as a "ported shroud" has been used since the 1980s to improve the flow range of compressors used on high BMEP engines, typically highly boosted diesel engines that operate across a relatively wide speed range (for diesel engines) such as truck engines and industrial/agricultural engines.

A turbocharger compressor with a ported shroud, as shown in FIG. 1, employs a compressor housing 1 and a compressor wheel 2 having an inducer 3 and an exducer 4 feeding a volute 5 through a diffuser 6. Air is received through an inlet 7 and a recirculation channel using a ported shroud cavity 8 receiving air through a slot 9 to increase the mass flow through the inducer which prevents stalling. A noise suppressor or silencer 10 is often incorporated. The recirculation provided by the ported shroud is not thermodynamically free as it increases the work the turbine has to do to pump the extra air in this short loop. But, even worse is that this recirculation heats the air that is recirculated significantly. When this hot air is blended back into the fresh air at the inlet of the compressor, it reduces the efficiency of the compressor (equation 1) and increases the work required of the turbine (equation 2). If the inlet pressure and temperature are measured far enough upstream not to be impacted by recirculation, the efficiency will be lowered by the recirculated flow. If the inlet temperature and pressure are measured closer to the compressor where the recirculated flow impacts the inlet temperature measurement, then the efficiency will be measured as higher, but the power required by the turbine is still increased by the higher T1 measurement.

In the area of the map where the ported shroud is not necessary, it creates an additional loss and reduces the efficiency there as well. The ported shroud generally reduces the peak efficiency of a compressor by 1-3 points.

$$\eta_c = \frac{T_1 \times (\pi_c^{(\gamma-1)/\gamma} - 1)}{T_2 - T_1} \qquad \text{(Equation 1)}$$

$$\dot{W}_c = \frac{\dot{m}_a \times c_{pa} \times T_1 \times (\pi_c^{(\gamma-1)/\gamma} - 1)}{\eta_c} \qquad \text{(Equation 2)}$$

One device that eliminates the hot air from the ported shroud being recirculated to the inlet is shown in U.S. Pat. No. 8,511,083, Ported Shroud with filtered external ventilation. But, the other losses of the ported shroud are still present.

The ported shroud is only effective at moving the surge line to lower flow at higher pressure ratios. The ported shroud is not used on most gasoline and diesel passenger car engines because their compressor map width requirement is most severe at lower pressure ratio values where the ported shroud is not effective.

Another negative feature of a ported shroud is that it can cause noise issues and often requires a noise baffle be incorporated into the design. This audible vibration can also fail the compressor blades if a resonance condition is present.

There is an unfilled need in turbocharger technology for a device that improves the surge performance of a compressor at both high and low pressure ratio, and does not reduce the efficiency of the compressor or induce vibrations that are audible or cause resonant with the blades.

SUMMARY

The embodiments herein disclose an apparatus for use with a radial compressor having a compressor wheel with blades that define an inducer and an exducer, an inlet air passage with a first region and a second region separated from the first region from a point adjacent to the inducer to an air filter, each region having a separate air filter.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
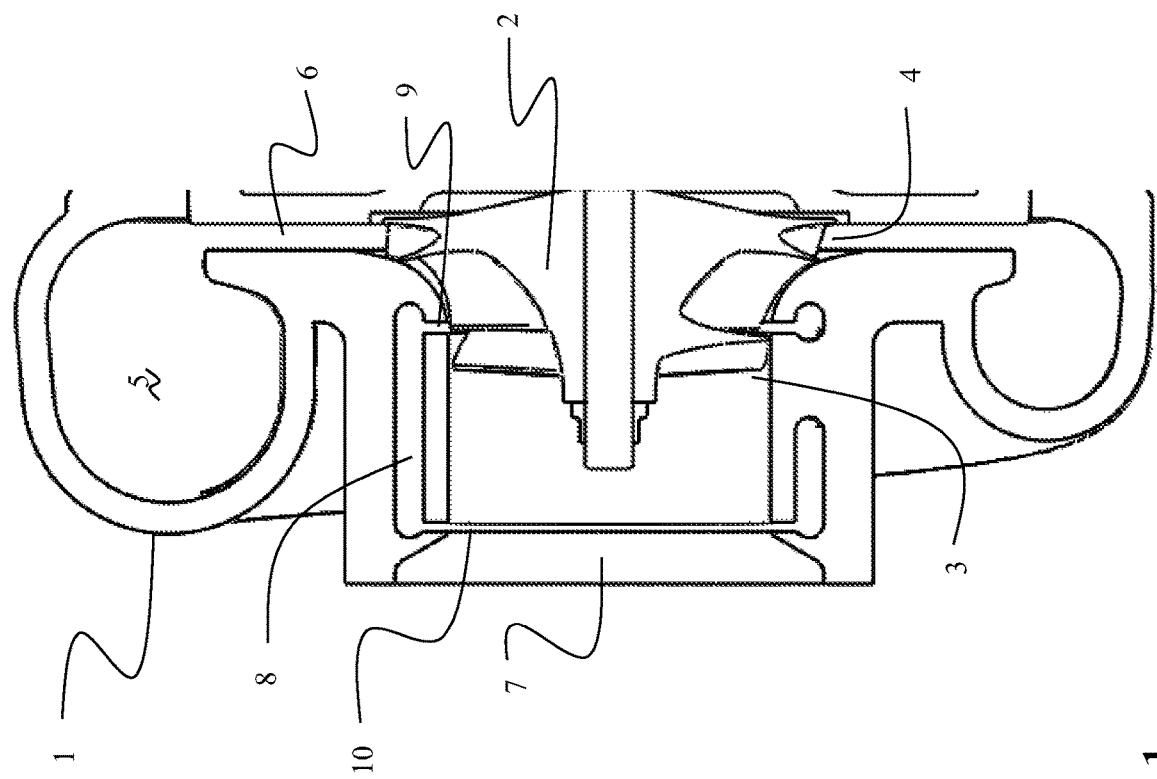
FIG. 1 is a section view of a typical prior art ported shroud with silencer.
Figure 2:
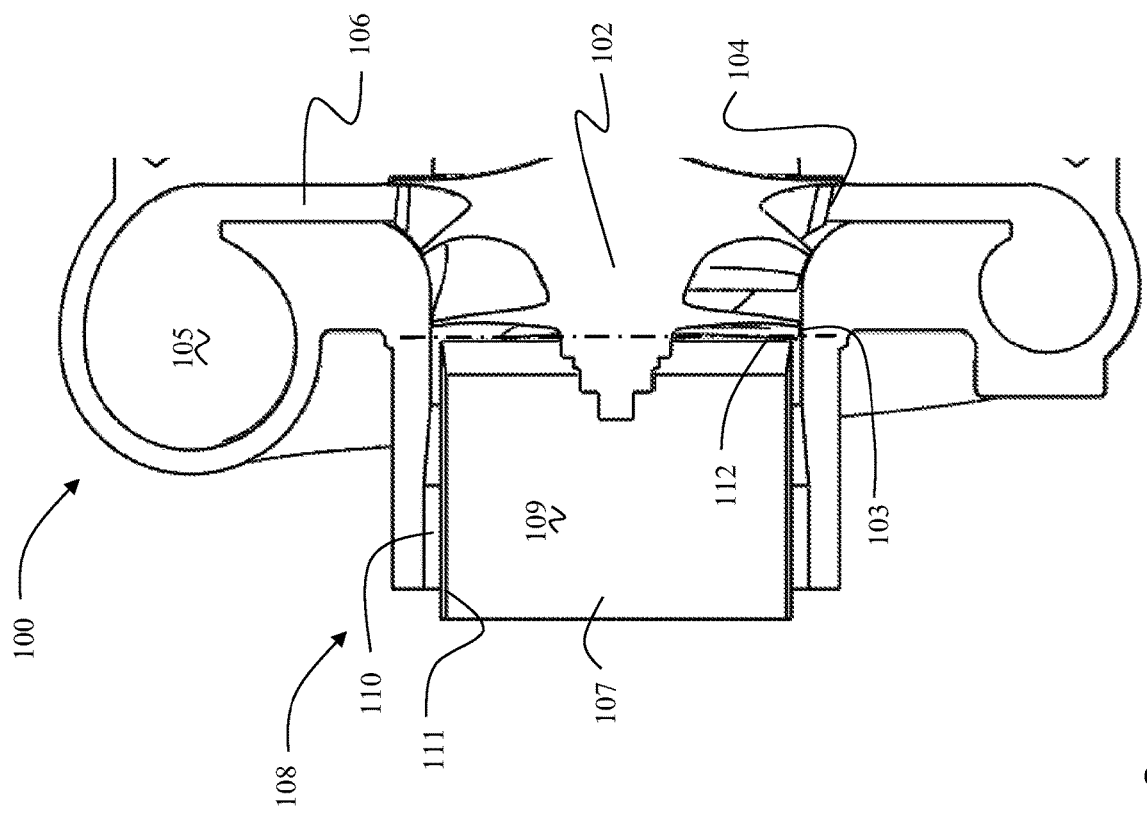
FIG. 2 is a section view of a first embodiment of a basic Wide Flow Range Inlet.

The embodiments shown herein for a wide flow range inlet solves these problems. Referring to the drawings, FIG. 2 shows a turbocharger compressor 100 having a compressor housing 101 and a compressor wheel 102 having an inducer 103 and an exducer 104 feeding a volute 105 through a diffuser 106. Air is received through an inlet 107. A wide flow range inlet 108 splits the inlet flow passage into a first inner region 109 and a second inner region 110 concentrically separated by an inlet divider wall 111 which separates the second region from the first region and terminates at an inlet plane 112 of the inducer 103. This eliminates the losses associated with the ported shroud as well as eliminates the recirculation of hot gas into the compressor. While defined as an inlet plane, the profiles on the compressor blades in alternative embodiments may employ a sweep in the inducer resulting in a region of flow into the blades which extends along the inlet axis and the termination of the divider wall is positioned at a point in the blade profile to segregate flow in the regions for desired characteristics as will be described subsequently.

The wide flow range inlet separates the incoming air stream into multiple, concentric regions, the simplest version being the inner and outer regions 109, 110 of the first embodiment. In alternative embodiments, multiple concentric regions each separated by concentric divider walls terminating proximate the inducer inlet plane (or at points along the blade profile) may be employed. For the shown embodiment with two concentric regions, feedback of the subsonic flow through the inducer blades back into the inlet flow stream allows two different amounts of swirl to be generated, which can improve the efficiency of the compressor. A movable array of vanes may be included in one or all of the regions to induce positive or negative swirl to the flow in the associated passages.

With the wide flow range inlet, each of the concentric regions is separated at the filter end of the inlet ducting from the other concentric regions and each region receives inlet air through a separate air filter. At the end proximate the inducer inlet, the regions are separated by the divider wall(s) until close proximity of the blade profile of the compressor wheel. Each concentric region has the possibility of flow going in either direction.

Figure 3:
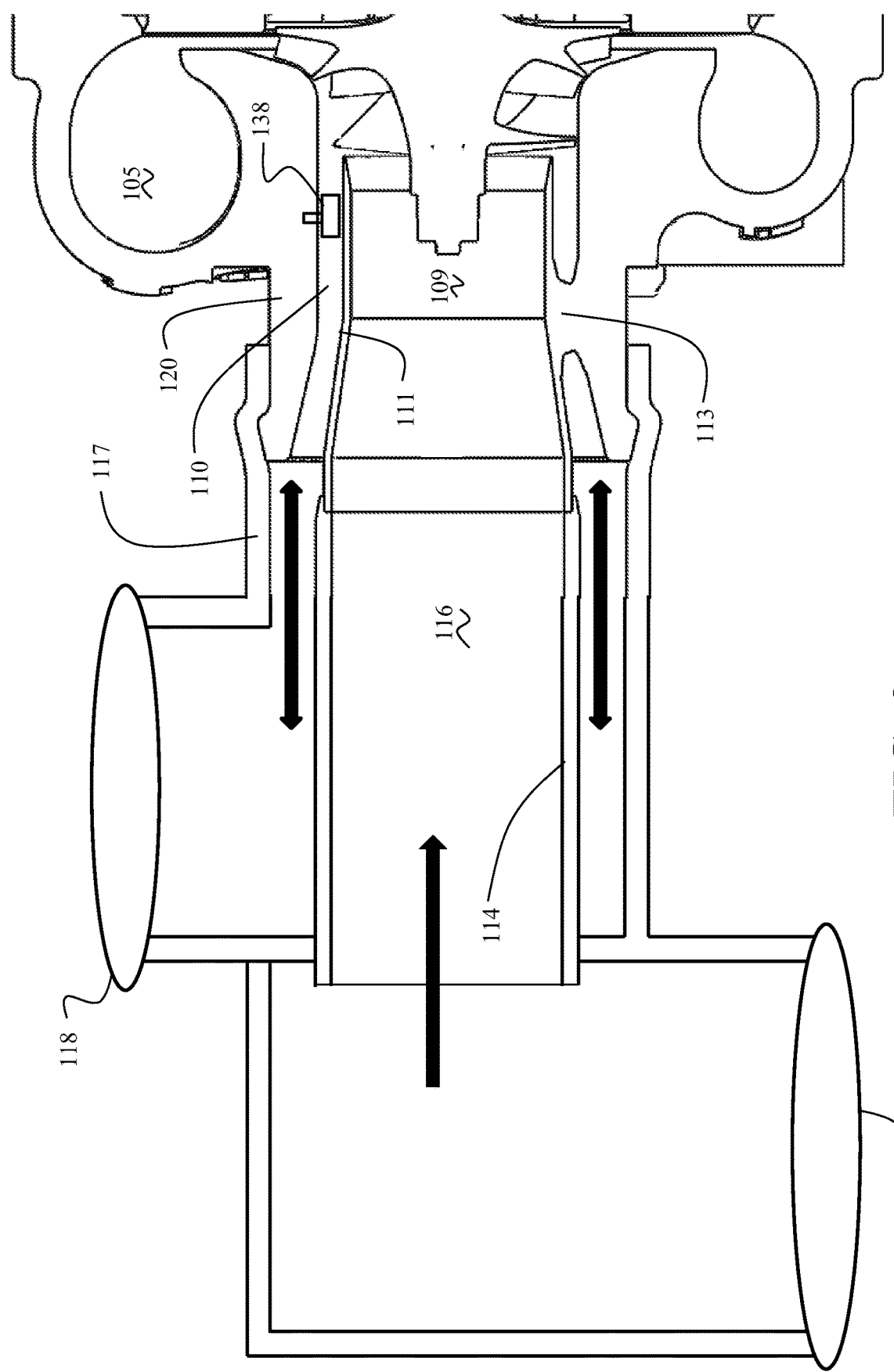
FIG. 3 is a section view showing the embodiment of the basic wide flow range inlet and showing inlet connections.

As seen in FIG. 3, for the embodiment of two concentric regions, the divider wall 111 is connected to the compressor housing 120 with at least one strut 113 (multiple struts may be spaced circumferentially about the divider wall) extending through the outer concentric region 110. The inner concentric region 109 remains segregated by an inner tube 114 connecting the divider wall 111 to a first air cleaner 115 (not shown to scale) to provide a main air passage 116 into the inner concentric region. An outer hose 117 engages the compressor housing 120 at the outer circumference of the outer concentric region 110 connecting to a second air cleaner 118 (which may concentrically surround the first air cleaner but is separated from the first air cleaner 115) to provide a secondary air passage 119 into the outer concentric region. The flow from the first and second air cleaners into the inner and outer concentric regions is substantially axial. As shown by arrows 121 flow in the outer concentric region 110, which provides a bi-directional cavity, and the secondary air passage 119, which provides a bi-directional air passage, may flow in either direction. Flow rejected by the inducer may thereby be expelled outwardly. Vanes 138, which may be movable and arranged in one or more arrays, may be employed to induce swirl as will be described subsequently.

Figure 4:
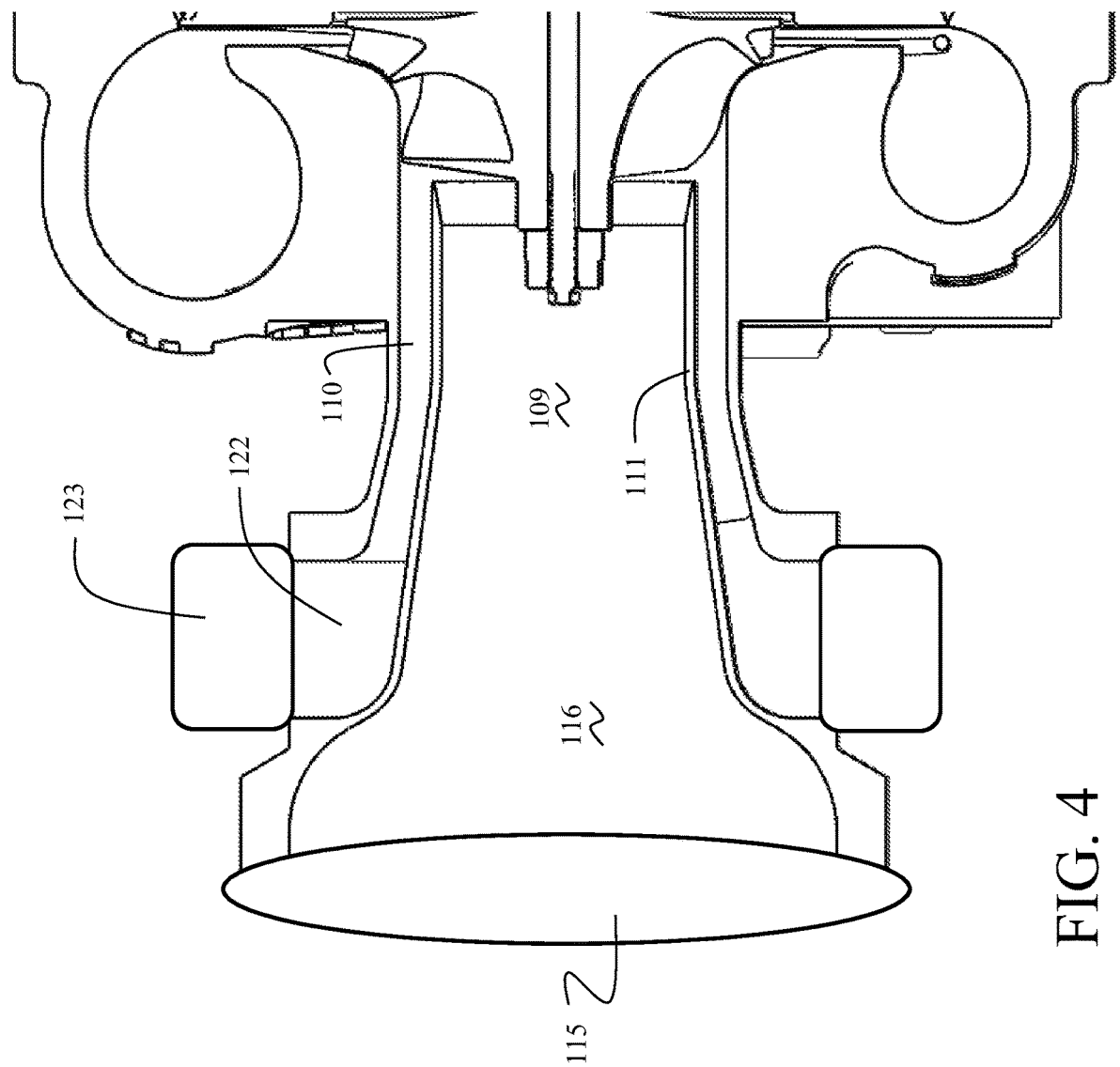
FIG. 4 is a section view showing an embodiment of the wide flow range inlet with axial and radial inlets.

In a first alternative embodiment seen in FIG. 4, the main air passage 116 is engaged to the first air cleaner 115 providing axial flow, while a secondary air passage 122 connecting to outer concentric region 110 turns to receive inlet flow radially from a second air cleaner 123.

In the design of a compressor wheel or impeller, the blade shape at the inducer has a varying angle to the incoming flow from hub to shroud. This is because the tip speed of the blade increases from hub to shroud. Being subsonic flow in the passage before the inducer, the flow field in the inducer feeds back into the passage flow field and creates a swirl in the passage, with the highest swirl in the outer part of the passage, and the least swirl in the center of the passage.

Figure 5:
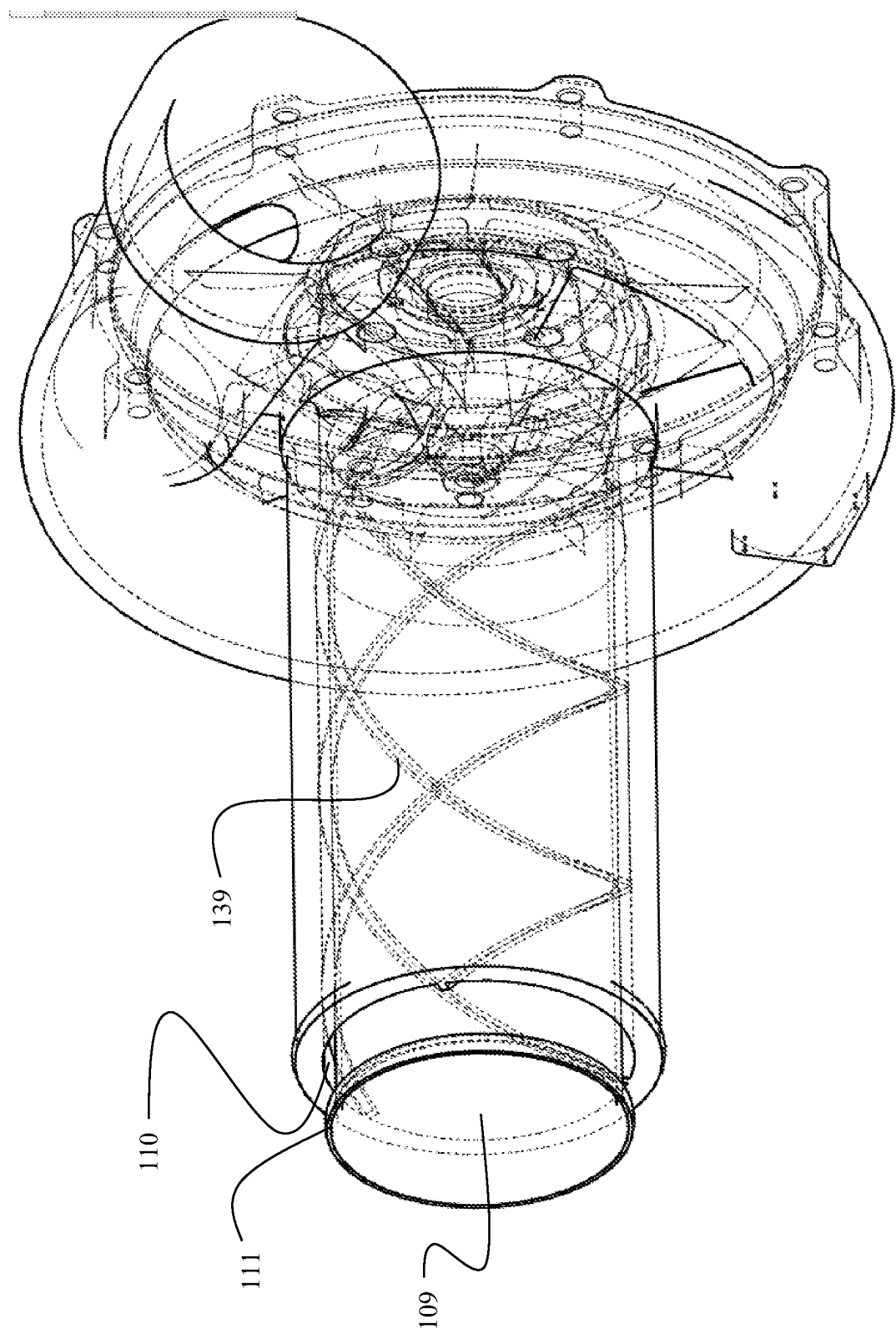
FIG. 5 is a phantom view showing swirl vanes in the outer region of the inlet.

As sub-sonic flow, this swirl tends to be self-aligning. Having the separate concentric regions in the inlet passage, as previously described, tends to allow different regions of the inlet passage to align with the corresponding region in the wheel inducer. Further, each region may employ vanes 139 or texturing over a portion of or the entire length producing subdivided passages that are constructed with a positive or negative swirl angle as seen in FIG. 5.

Figure 6:
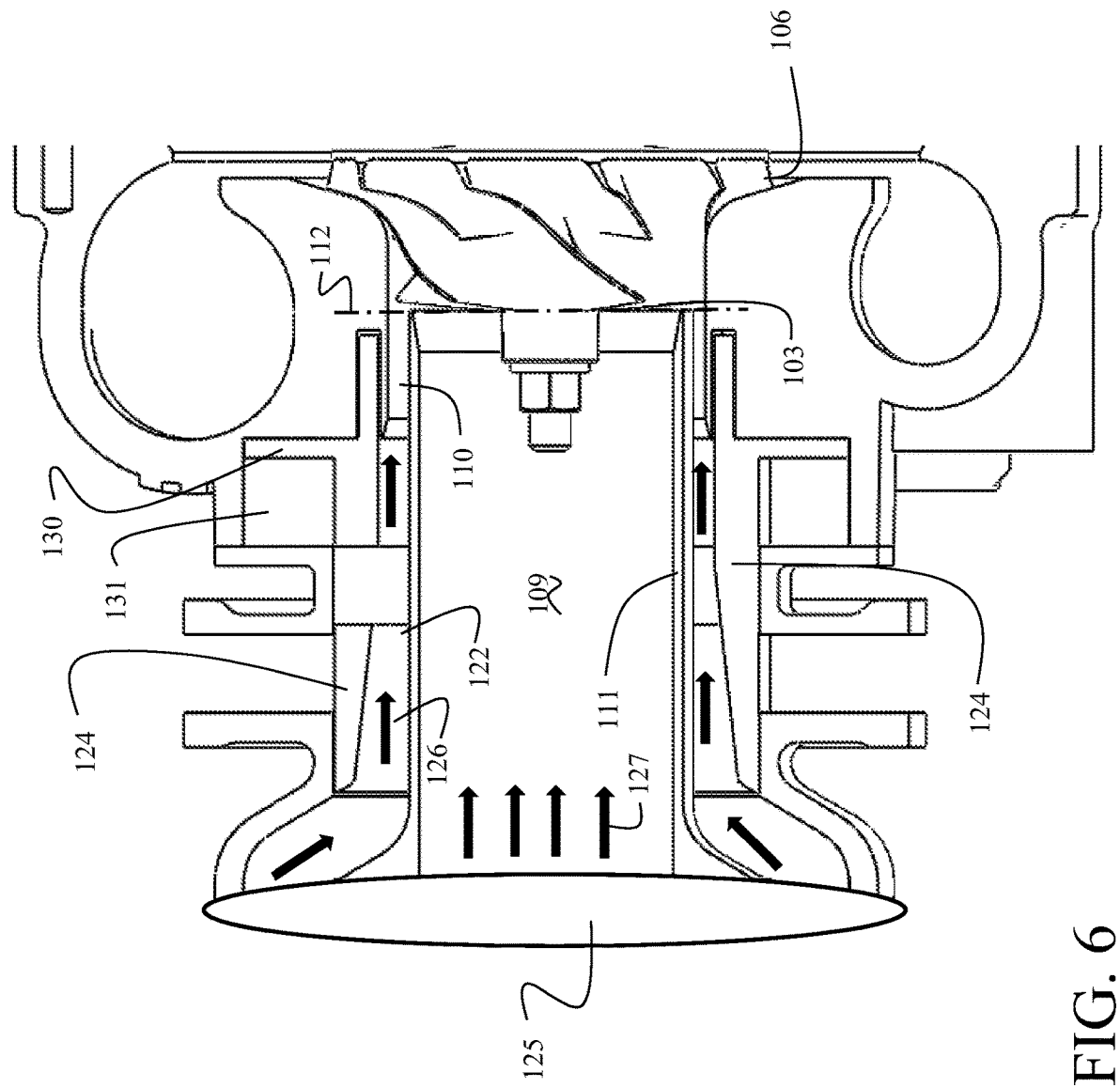
FIG. 6 is a section view of an embodiment of an wide flow range inlet with an active design in the non-activated flow condition.
Figure 7:
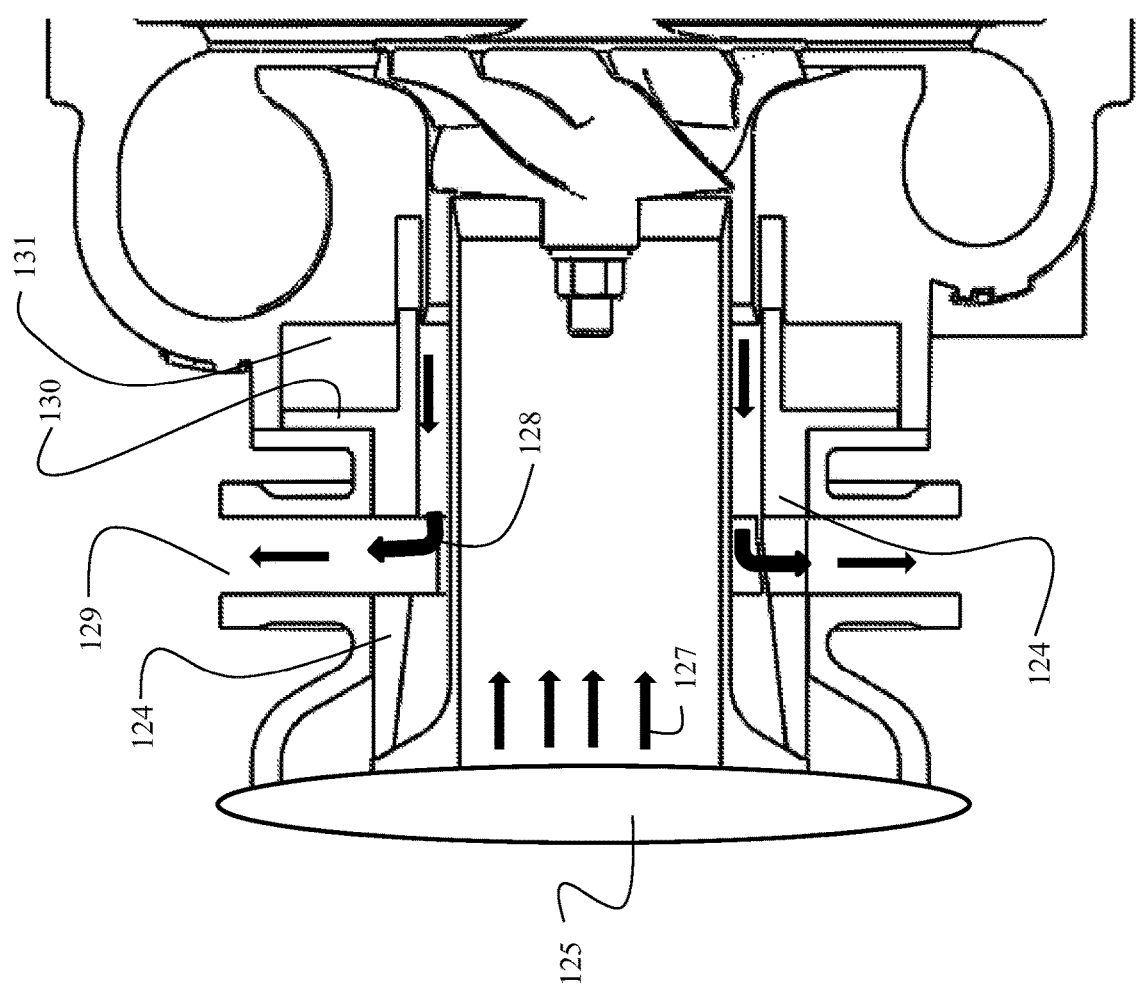
FIG. 7 is a section view of the embodiment of FIG. 5 in the activated condition.

A second alternative embodiment shown in FIGS. 6 and 7 allows the use of just one inlet with one air cleaner. This embodiment includes a valve 124 that can be opened or closed. When the valve is open as shown in FIG. 6, air flows from the air cleaner 125 to through secondary air passage 122 into the outer region 110 and into the compressor inducer 103 as indicated by arrows 126. This flow then augments the primary flow (indicated by arrows 127) through inner region 109 into the inducer.

When closed as shown in FIG. 7, the valve 124 directs flow rejected from the inducer (indicated by arrows 128) into an exit duct 129

The valve 124 for an exemplary embodiment is passive, using the vacuum and pressures existing within the housing to move a control piston 130 carried in cylinder 131 to either of two positions with appropriate porting of the cylinder. It can also be designed to be actively controlled, wherein the boost pressure can be applied in the cylinder 131 to one side of the piston if a solenoid (not shown) is energized, or the cylinder vented to ambient or sub-ambient pressure from the inlet stream if the solenoid is not activated.

Figure 8:
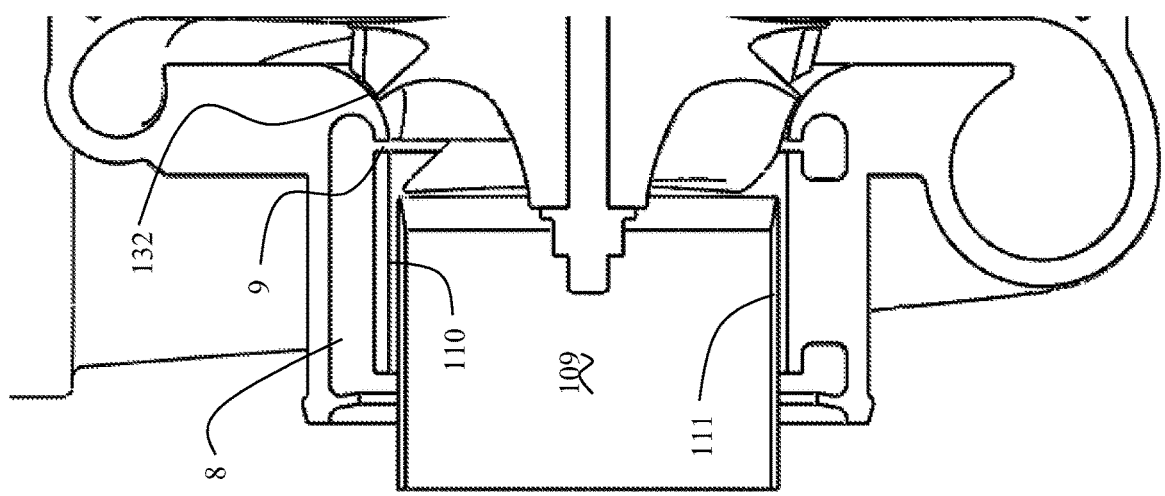
FIG. 8 is a section view showing an embodiment of a wide flow range inlet combined with a Ported Shroud; and, FIG. 9 is a section view with a schematic representation of a heat exchange cooling system.

As shown in FIG. 8, the wide flow range inlet may also be incorporated with a ported shroud. An additional passage is provided in the form of a ported shroud cavity 8 from the outer region 110 of the air inlet passage to a slot 9 adjacent to a compressor shroud line 132, substantially midway (40-60%) down the compressor shroud line between the inducer and exducer.

Figure 9:
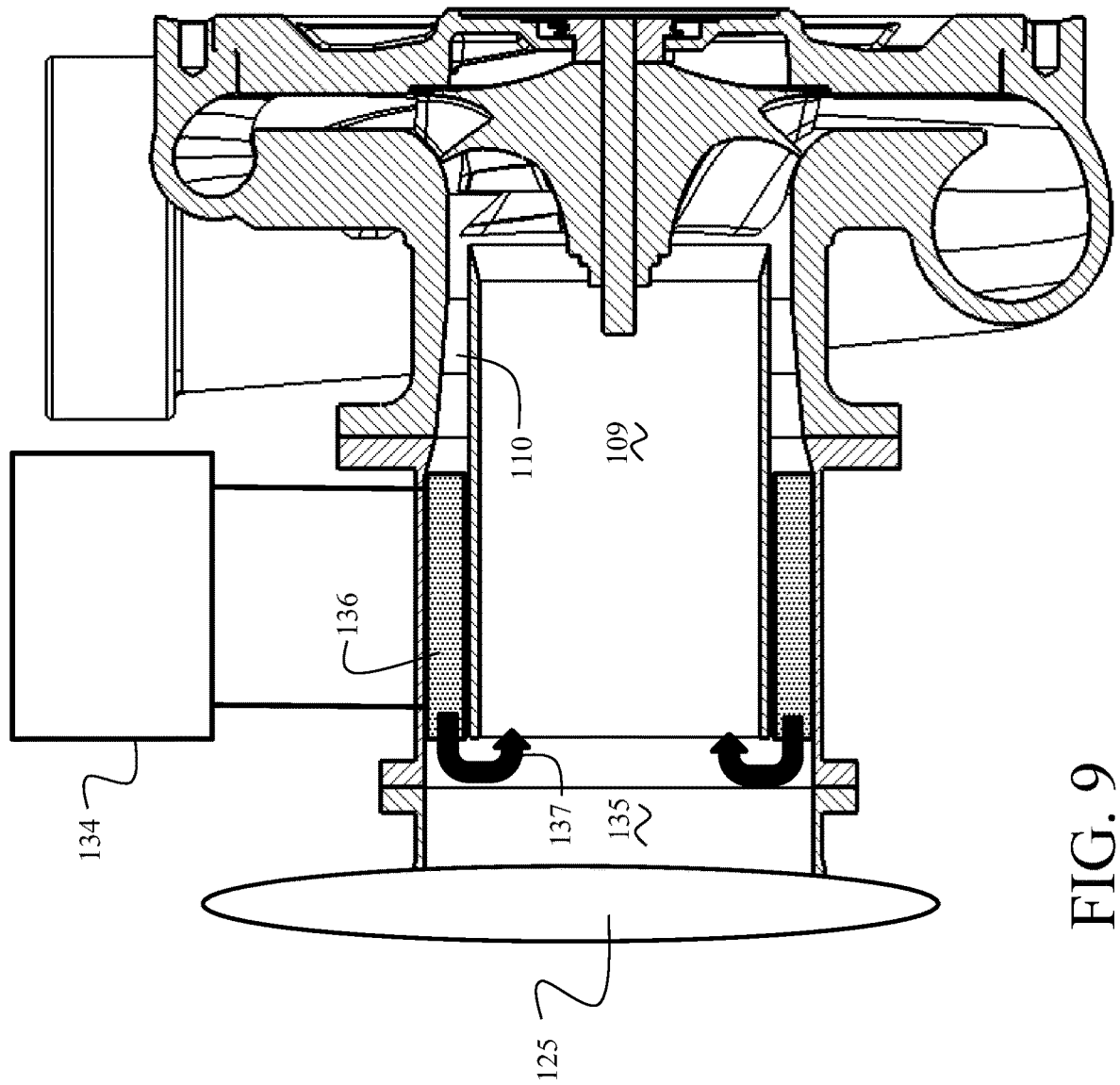

Another alternative to adding a second air filter is to cool the hot air in the outer concentric region when rejected by the inducer and then merge it back into the main flow in the inner concentric region as shown in FIG. 9. Engine cooling water is typically too hot to provide cooling so a low temperature cooling source would be necessary. Various engines now have a second cooling loop 134 which is very close to ambient temperature, and thus would be an appropriate cooling source for attachment to a heat exchanger 135 located in the outer concentric region 110 distal from the plane of the inducer. Divider wall 111 terminates past the heat exchanger in a common inlet plenum 135 proximate the air filter 125. Flow rejected by the inducer flows through the heat exchanger 136 and is then returned to the inner concentric region 109 (as represented by arrows 137).

What is claimed:

1. A radial compressor comprising:
a compressor wheel having an inducer;
an inlet air passage connected to and providing inlet flow into the inducer, said inlet air passage having
a first region and
a second region concentric with but separated from the first region by a divider wall, said divider wall extending from an inlet plane of the inducer and connecting said first region to a first air filter and said second region to a second air filter.

2. The radial compressor as defined in claim 1, wherein said first region comprises an outer air inlet passage and the second region comprises an inner air inlet passage.

3. The radial compressor as defined in claim 2, further comprising an additional passage from the outer inlet air passage to a to a compressor shroud line through a slot in the compressor shroud line.

4. The radial compressor as defined in claim 2, wherein at least one of the inner and outer inlet passages comprise subdivided passages that are constructed with a positive or negative swirl angle.

5. The radial compressor as defined in claim 1, wherein the first and second regions have an axial inflow.

6. The radial compressor as defined in claim 1, wherein the first region has an axial inflow and the second region has a radial inflow.

7. The radial compressor as defined in claim 1, wherein one of first or second regions has a radial inflow.

8. The radial compressor as defined in claim 1, wherein at least one of the inner and outer regions comprises one or more passages that are subdivided into multiple passages for at least a portion thereof.

9. The radial compressor as defined in claim 1, wherein at least one of the first and second regions include a movable array of vanes to induce positive or negative swirl to the flow in the passage.

* * * * *